（12） United States Patent
Steimer (10) Patent No.: US 11,658,585 B2
(45) Date of Patent: May 23, 2023

(54) ARC FURNACE POWER SUPPLY WITH RESONANT CIRCUIT

(71) Applicant: ABB Schweiz AG, Baden (CH)

(72) Inventor: Peter Karl Steimer, Ehrendingen (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/622,439

(22) PCT Filed: May 8, 2020

(86) PCT No.: PCT/EP2020/062915
§ 371 (c)(1),
(2) Date: Dec. 23, 2021

(87) PCT Pub. No.: WO2020/259907
PCT Pub. Date: Dec. 30, 2020

(65) Prior Publication Data
US 2022/0352828 A1    Nov. 3, 2022

(30) Foreign Application Priority Data

Jun. 27, 2019  (EP) ..................................... 19182898

(51) Int. Cl.
| H02M 5/257 | (2006.01) |
| H05B 7/144 | (2006.01) |
| H02M 5/12 | (2006.01) |
| H02M 5/06 | (2006.01) |
| H05B 7/148 | (2006.01) |

(52) U.S. Cl.
CPC ............... *H02M 5/12* (2013.01); *H02M 5/06* (2013.01); *H02M 5/2573* (2013.01); *H05B 7/144* (2013.01); *H05B 7/148* (2013.01)

(58) Field of Classification Search
CPC ........ H02M 5/06; H02M 5/12; H02M 5/2573; H05B 7/144; H05B 7/148
See application file for complete search history.

(56) References Cited

U.S. PATENT DOCUMENTS

| 6,274,851 | B1 | 8/2001 | Mulcahy et al. |
| 6,573,691 | B2 | 6/2003 | Ma et al. |
| 6,603,795 | B2 | 8/2003 | Ma et al. |

(Continued)

FOREIGN PATENT DOCUMENTS

| EP | 0429774 A1 | 6/1991 |
| EP | 0589544 B1 | 1/2002 |

(Continued)

OTHER PUBLICATIONS

International Search Report and Written Opinion for corresponding International App. No PCT/EP2020/062915, dated Sep. 9, 2020, 8 pages.

*Primary Examiner* — Patrick O Neill
(74) *Attorney, Agent, or Firm* — Armstrong Teasdale LLP (57) ABSTRACT

A power supply system for an electric arc furnace includes an AC input connectable to an electrical grid and an AC output for supplying at least one power electrode of the arc furnace; a resonant circuit interconnected between the AC input and the AC output. The resonant circuit includes a controllable bypass switch for connecting and disconnecting a circuit input and a circuit output of the resonant circuit and a capacitor and a main inductor connected in parallel with the bypass switch.

15 Claims, 4 Drawing Sheets

(56) References Cited

U.S. PATENT DOCUMENTS

| | | | |
|---|---|---|---|
| 11,146,067 B2 * | 10/2021 | Campbell | H03K 17/72 |
| 2008/0063024 A1 | 3/2008 | Pasch et al. | |
| 2012/0314728 A1 | 12/2012 | Benzerrouk et al. | |
| 2022/0271681 A1 * | 8/2022 | Steimer | H05B 7/144 |

FOREIGN PATENT DOCUMENTS

| | | |
|---|---|---|
| EP | 3252906 A1 | 12/2017 |
| WO | 2016191861 A1 | 12/2016 |
| WO | 2017085330 A1 | 5/2017 |

\* cited by examiner

ARC FURNACE POWER SUPPLY WITH RESONANT CIRCUIT

CROSS-REFERENCE TO RELATED APPLICATIONS

The present disclosure is a National Stage Entry of International Patent Application No. PCT/EP2020/062915, filed May 8, 2020, which claims priority to European Patent Application No. 19182898.7, filed Jun. 27, 2019, the entire contents of which are hereby incorporated herein.

FIELD OF THE DISCLOSURE

The disclosure relates to the field of arc furnaces. In particular, the disclosure relates to a power supply system for an electric arc furnace, a method and a controller for controlling the power supply system as well as to an arc furnace with such a power supply system.

BACKGROUND OF THE DISCLOSURE

Electric arc furnaces are often directly connected to an AC grid via a transformer. It then may be difficult to limit the electrode current during operation, which may limit the electrode usage and the productivity. Additionally, the transformer may need then a costly on-load tap changer system, which is often used and the arc furnace may generate flicker in the AC grid. Therefore, an additional static var compensator may be necessary to mitigate the flicker issues.

In EP 0 589 544 B1 and U.S. Pat. No. 6,603,795 B2, an arc furnace power supply is shown, which is adapted for clipping the electrode current with series-connected antiparallel thyristors with or without a parallel inductor. In such a way, the productivity of the arc furnace may be improved. However, by clipping the current, an internal resistance of the arc furnace may be increased more than necessary, which may reduce the efficiency of the arc furnace.

U.S. Pat. No. 6,274,851 B1 shows a power supply for an arc furnace, which includes a semiconductor based switch in each of the phases. A snubber circuit with a capacitor and an inductance are connected in parallel to the switch.

EP 0 429 774 A1 shows an arc furnace power supply with a bidirectional semiconductor switch connected in parallel to an inductor, which is interconnected into a phase of the power supply.

US 2012/314 728 A1 shows an arc furnace power supply with bidirectional semiconductor switches connected in series to an inductor, which is interconnected into a phase of the power supply.

WO 2016/191 861 A1 describes a control system for an arc furnace power supply, which is adapted for flicker control. A bidirectional semiconductor switch is shown, which is connected in series and in parallel to inductors interconnected into a phase of the power supply.

BRIEF DESCRIPTION OF THE DISCLOSURE

The disclosure provides an arc furnace power supply, with controllable electrode current and high efficiency.

This is achieved by the subject-matter of the independent claims. Further exemplary embodiments are evident from the dependent claims and the following description.

A first aspect of the disclosure relates to a power supply system for an electric arc furnace. An electric arc furnace may be a device, which is adapted for melting or smelting metal materials with the aid of an arc that is produced by an electric current. The electric current is produced by the power supply system, which may be connected between a medium AC electrical grid and electrodes of the arc furnace. The power supply system also may include a transformer, which transforms a medium AC input voltage into a low AC output voltage, which is supplied to the electrodes.

A medium voltage may be a voltage between 1 kV and 20 kV. A low voltage may be a voltage below 1 kV. It has to be noted that the current through the electrodes may be higher than 1000 A.

The power supply system may be a multi-phase system having several, such as three, phases. The input voltage may be a three-phase voltage, with, for example, 50 or 60 Hz.

According to an embodiment of the disclosure, the power supply system includes an AC input, which may include one or more phases, connectable to an electrical grid and an AC output, which may include one or more phases, for supplying at least one power electrode of the arc furnace. The AC input may include three phases. Also, the AC output may include three phases.

According to an embodiment of the disclosure, the power supply system includes a resonant circuit interconnecting the AC input and the AC output, wherein the resonant circuit includes a controllable bypass switch for connecting and disconnecting a circuit input and a circuit output of the resonant circuit. The resonant circuit may include a capacitor and a main inductor connected in parallel with the bypass switch. The capacitor and the main inductor may be connected in series and/or may be connected between the circuit input and the circuit output. The resonant circuit may be interconnected in a phase of the AC input and/or in a phase of the AC output.

According to an embodiment of the disclosure, the power supply system includes a controller for controlling the bypass switch, such that a circular current is formed in the resonant circuit, when the bypass switch is closed, which lowers a current through the power supply system.

By controlling the bypass switch, a current through the resonant circuit may be controlled, when the bypass switch is open, a current through the resonant circuit solely may flow from the circuit input through the capacitor and a main inductor to the circuit output and vice versa. In the case, the bypass switch is closed, the current also may flow from the circuit input through the bypass switch to the circuit output and vice versa. Additionally, a circular current may flow through the resonant circuit, when the bypass switch is closed. This circular current may flow through the bypass switch, the capacitor and the main inductor.

By controlling the current through the resonant circuit in this way, the current through the power supply system may be controlled. In particular, the current through the power supply device may be controlled and/or adjusted to a specific nominal and/or defined current, which may be lower than a maximal current that may be generated by the power supply system.

The capacitor of the capacitor and the inductance of the inductor may be chosen, such that the resonant circuit has a low impedance at the ground frequency of the AC voltage processed by the arc furnace, i.e. the AC voltage from the electrical grid. The impedance at this frequency may be lower as at other frequencies and/or may have a minimum. In such a way, an internal resistance of the arc furnace may be reduced.

According to an embodiment of the disclosure, a further inductor is connected in series with the bypass switch between the input and the output. The further inductor may be decoupled from the current through the resonant circuit, when the bypass switch is open.

According to an embodiment of the disclosure, the further inductor is connected in parallel with the capacitor and the main inductor. When the bypass switch is closed, a current through the bypass switch also may flow through the further inductor. Furthermore, the further inductor may contribute to the inductance of the resonant circuit in view of circular currents.

According to an embodiment of the disclosure, the main inductor has a higher inductance as the further inductor. For example, the main inductor may have an inductance at least 10 times higher as the further inductor.

According to an embodiment of the disclosure, the bypass switch is composed of semiconductor switches. For example, the bypass switch may include one or more transistors or thyristors, such as IGBTs, IGCT, etc.

According to an embodiment of the disclosure, the bypass switch is a bidirectional switch. This may be achieved by connecting two unidirectional semiconductor switches anti-parallel to each other.

According to an embodiment of the disclosure, the bypass switch includes two anti-parallel semiconductor switches, such as two anti-parallel thyristors. Thyristors are adapted for switching high currents as usually are present in the power supply of an arc furnace.

According to an embodiment of the disclosure, the power supply system further includes a transformer, which is interconnected between the AC input and the AC output of the power supply system. As already described, the transformer, which may be a multi-phase transformer, may transform a higher AC input voltage into a lower AC output voltage.

According to an embodiment of the disclosure, the transformer may be interconnected between the AC input and the resonant circuit. In other words, the resonant circuit may be provided on the side of the power supply system with the higher voltage.

According to an embodiment of the disclosure, the transformer may be interconnected between the resonant circuit and the AC output. In other words, the resonant circuit may be provided on the side of the power supply system with the lower voltage.

According to an embodiment of the disclosure, the power supply system further includes a harmonic filter interconnected in the AC input. With the harmonic filter, higher order harmonics in the AC input voltage, which may be generated by components of the arc furnace, may be filtered out. The harmonic filter may include at least two filter components, each of which includes a filter capacitor and a filter inductor and each of which is adapted to another higher order harmonic of a supply voltage, i.e. the AC input voltage.

The harmonic filter may be a capacitive and/or inductive filter connected in parallel with the AC input. In the case of a multi-phase system, the harmonic filter components may star-connect the phases of the AC input. It has to be noted that also a series-connected filter may be interconnected into the AC input.

According to an embodiment of the disclosure, the power supply system further includes an active inductive reactor interconnected into the AC input, wherein the active inductive reactor includes a bypass switch and an inductor connected to the AC input. The bypass switch of the active inductive reactor may be designed as the bypass switch of the resonant circuit, for example with two anti-parallel thyristors. In the case of a multi-phase system, the active inductive reactor may have reactor branches, which star-connect the phases of the AC input.

According to an embodiment of the disclosure, the power supply system further includes a compensating converter interconnected into the AC input. The compensating converter may be voltage-source based STATCOM. In the case of a multi-phase system, the compensating converter may have converter branches, which star-connect the phases of the AC input.

The active inductive reactor and/or the compensating converter may be controlled by a controller of the power supply system and/or may be used for compensating variations of the power flow through the power supply system and/or for compensating voltage variations in the AC input.

According to an embodiment of the disclosure, the active inductive reactor and/or the compensating converter are controlled to minimize a flicker in the AC input. Flicker may be minimized at the point-of-common connection of the arc furnace to the electrical grid. The flicker reduction may be a second control objective in addition to a control of the power flow to the arc furnace.

Flicker in the electrical grid may be fluctuations in the voltage of the grid and may be determined based on voltage measurements in the AC input. The standard IEC 61000-4-15 provides methods and/or formulas for estimating flicker.

According to an embodiment of the disclosure, the AC input has at least two phases, such as three phases, and/or the AC output has at least two phases, such as three phases. A resonant circuit as described in the above and in the following may be interconnected in each phase of the AC input or the AC output. In the case of a multi-phase system, every phase of the side of the power supply before or after the transformer may be provided with a resonant circuit.

Further aspects of the disclosure relate to a method and a controller for controlling the power supply system as described in the above and in the following. It has to be understood that features of the method as described in the above and in the following may be features of the controller and/or the power supply system as described in the above and in the following. The controller may be adapted for automatically performing the method.

According to an embodiment of the disclosure, the method includes: determining an electrode current supplied to the at least one electrode; and controlling the bypass switch, such that the electrode current is adjusted to a defined current, such as a nominal current. A current through the power supply system may be measured by the controller at the input side and/or at the output side. Therefrom, the electrode current may be determined. Depending on the needed power to be supplied to the electrodes, which for example may depend on the phase of the melting process and/or the amount of melted material, a defined current may be provided and the controller may adjust the electrode current to this current. The defined current may be provided by the controller, for example based on measurements in the power supply system.

The bypass switch is controlled such that a circular current is formed in the resonant circuit, when the bypass switch is closed, which lowers a current through the power supply system.

The control may be performed by opening and closing the bypass switch accordingly. This may be done with a specific frequency.

According to an embodiment of the disclosure, a duty cycle of the bypass switch is adjusted to control the electrode current. The duty cycle of the bypass switch may be a time interval of a period of the current through the resonant circuit, in which the bypass switch is open, i.e. conducting. A longer the duty cycle as higher the current.

According to an embodiment of the disclosure, the method further includes: detecting an overvoltage and/or a surge current in the resonant circuit; and protecting the resonant circuit with the bypass switch, when an overvoltage and/or a surge current is detected, by opening and/or closing the bypass switch. The bypass switch also may be used to protect the resonant circuit against overvoltage and/or surge currents, for example during start-up and/or transient operation. The voltage and/or the current in the resonant circuit may be measured by the controller, which also may compare these values with thresholds, which indicate an overvoltage and/or a surge current. When the corresponding values exceed the threshold, the protection function may be activated. For example, the bypass switch may be closed to reduce the voltage across the capacitor and the main inductor and/or to reduce a current through the capacitor and the main inductor.

A further aspect of the disclosure relates to an electric arc furnace, which includes a power supply system as described in the above and the following.

According to an embodiment of the disclosure, the electric arc furnace furthermore includes a vessel for receiving metal material and/or power electrodes for melting the metal material, when supplied with current from the power supply system. The power electrodes also may have a mechanical mechanism, which is adapted for adjusting a distance of the electrodes to the metal material. The controller of the power supply system also may control this mechanism for adjusting the impedance of the system including the electrodes and the metal material. Less use of a tap changer and/or less electrode movements are expected. Tap changers may even be eliminated.

These and other aspects of the disclosure will be apparent from and elucidated with reference to the embodiments described hereinafter.

BRIEF DESCRIPTION OF THE DRAWINGS

The subject-matter of the disclosure will be explained in more detail in the following text with reference to exemplary embodiments which are illustrated in the attached drawings.

The reference symbols used in the drawings, and their meanings, are listed in summary form in the list of reference symbols. In principle, identical parts are provided with the same reference symbols in the figures.

DETAILED DESCRIPTION OF THE DISCLOSURE

Figure 1:
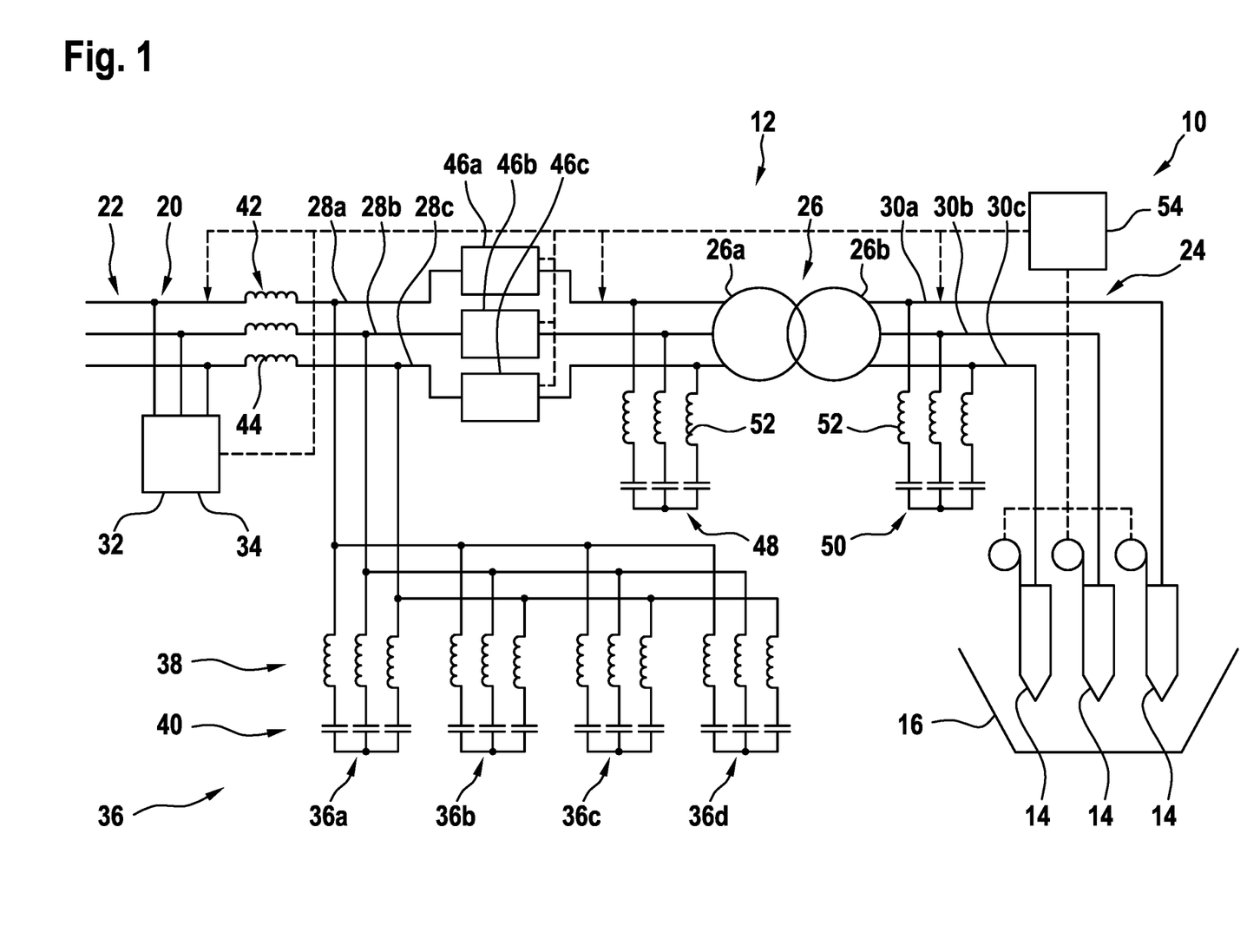
FIG. 1 shows a schematic circuit diagram of an arc furnace according to an embodiment of the disclosure.
Figure 2:
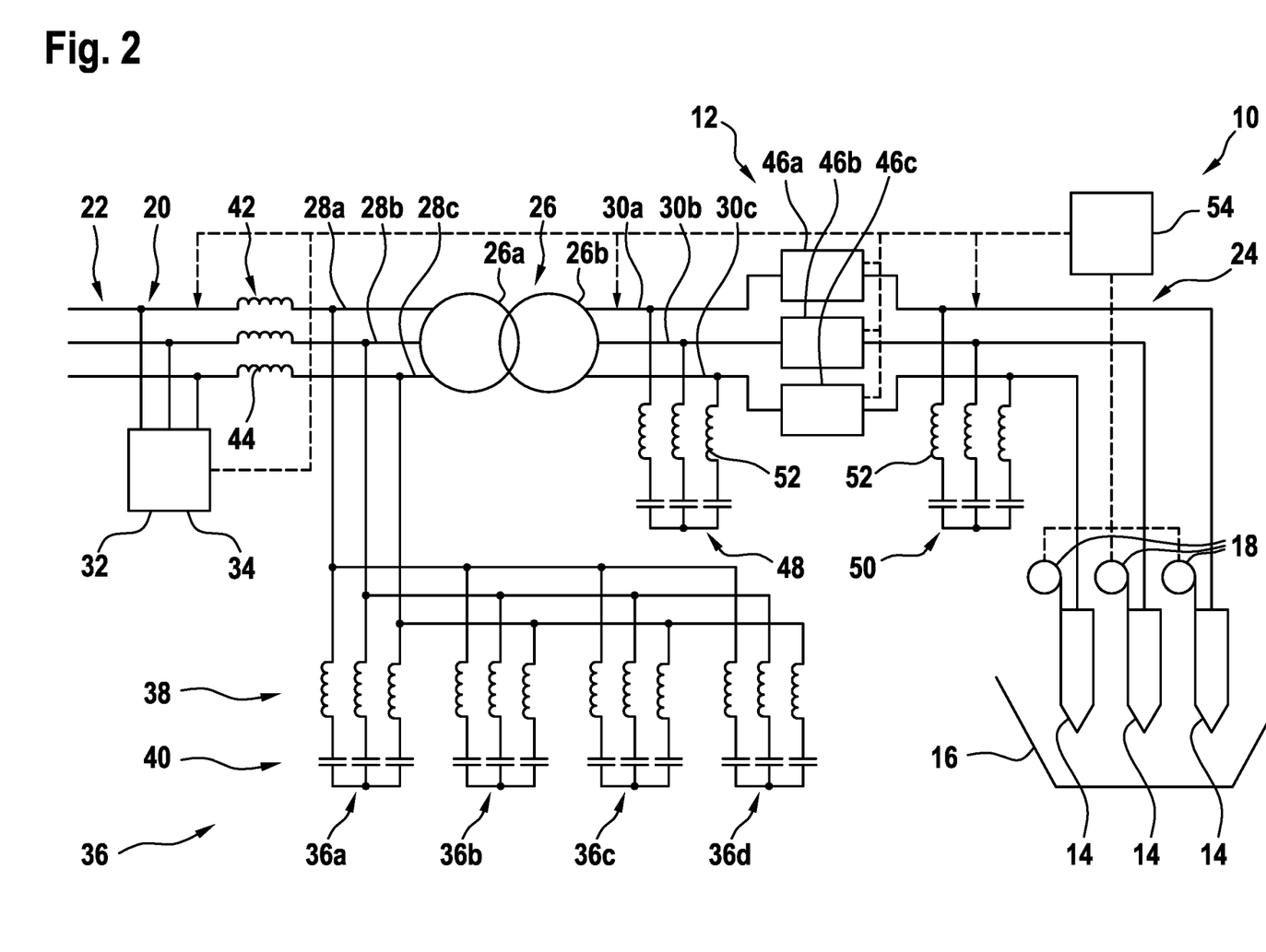
FIG. 2 shows a schematic circuit diagram of an arc furnace according to a further embodiment of the disclosure.

FIGS. 1 and 2 show an arc furnace 10 with a power supply system 12, which supplies electrodes 14 of the arc furnace 10 with electrical power. The electrodes 14 may be provided in a vessel 16, which is adapted for accommodating metal material. When the electrodes 14 are supplied with current, an electrical arc is generated and the metal material is melted. The electrodes may be moved in the vessel with the aid of mechanical actuators 18. In such a way, the length of the arc may be controlled.

The power supply system 12 is connected with an AC input 20 to an electrical grid 22 and supplies with an AC output 24 the electrodes 14. The AC input 20 and the AC output 24 are galvanically separated by a transformer 26. The transformer 26 transforms a medium AC voltage from the electrical grid 22 into a low AC voltage at the AC output 24. Both voltages may have a frequency of 50 Hz or 60 Hz.

As shown in FIGS. 1 and 2, the power supply system 12 may be a three-phase system. The AC input voltage may have three components and the power supply system 12 may have three phases 28a, 28b, 28c at the primary, medium voltage side of the transformer 26. As shown, the power supply system 12 also may have three phases 30a, 30b, 30c at the secondary, low voltage side of the transformer 26. However, it is also possible that a different number of phases are present as well on the primary side as on the secondary side. It is also possible that the numbers of phases are different on both sides, for example, when the transformer 26 is designed with more than three windings at the secondary side.

It may be that an active inductive reactor 32 and/or a compensating converter 34 is interconnected into and/or connected to the AC input 20, which is used for controlling flicker, which is generated by the arc furnace 10. The active inductive reactor 32 and/or a compensating converter 34 may be connected in parallel to the AC input 20. The components 32, 34 will be described in more detail below with respect to FIGS. 4 and 5.

Furthermore, a harmonic filter 36 may be interconnected into and/or connected to the AC input 20. The harmonic filter 36 may be connected in parallel to the AC input 20. The harmonic filter 36 may include several filter components 36a, 36b, 36c, 36d, each of which is adapted to filter a specific higher order harmonic out of the AC voltage at the AC input 20. For example, the filter components 36a, 36b, 36c, 36d may be adapted for filtering out the $5^{th}$, $7^{th}$, $11^{th}$ and $13^{th}$ higher order harmonic. Each of the filter components 36a, 36b, 36c, 36d may be an LC filter and may include a capacitor 38 and an inductor 40, which may be connected in series. In the present case of a system with three phases 28a, 28b, 28c, each of the filter components 36a, 36b, 36c, 36d may include for each phase a capacitor 38 and an inductor 40, which are star-connected.

It also may be that a line filter 42, which is series-connected into the AC input 20, is present, which line filter 42 may include an inductor 44, which is series-connected into each phase 28a, 28b, 28c.

As shown in FIG. 1, the power supply system 12 furthermore may include a resonant circuit 46a, 46b, 46c, which is series-connected into each phase 28a, 28b 28c of the primary side. As shown in FIG. 2, alternatively or additionally, a resonant circuit 46a, 46b, 46c may be series-connected into each phase 30a, 30b, 30c of the secondary side. The resonant circuits 46a, 46b, 46c are used for current limitation and/or power control and will be described in more detail with respect to FIG. 3.

It may be possible that a passive filter/reactor 48 is connected between the circuits 46a, 46b, 46c and the transformer 26 and/or that a passive filter/reactor 50 is connected between the transformer 26 and the AC output 24. Such a passive filter/reactor 48 (or 50) may include three star-connected inductors 52, each of which is connected to a phase 28a, 28b, 28c (or 30a, 30b, 30c) of the primary side (or secondary side) of the power supply system 12.

FIGS. 1 and 2 also show a controller 54 for controlling the arc furnace and the power supply system 12. The controller 54 may receive measurement values from voltages and/or currents in the power supply system 12, such as an AC input voltage, an AC input current, an intermediate voltage and an intermediated current between the resonant circuits 46a, 46b, 46c and the transformer, an AC output voltage and an AC output current. All these quantities may be multi-phase quantities.

Form these measurements, values and based on nominal quantities, such as a nominal electrode current, a nominal power supplied to the electrodes 14, a maximal flicker, etc., the controller may control the movement of the electrodes 14, i.e. the mechanical actuators 18, the active inductive reactor 32, the compensating converter 34 and the resonant circuits 46a, 46b, 46c. This will also be described in more detail with respect to FIG. 6.

Figure 3:
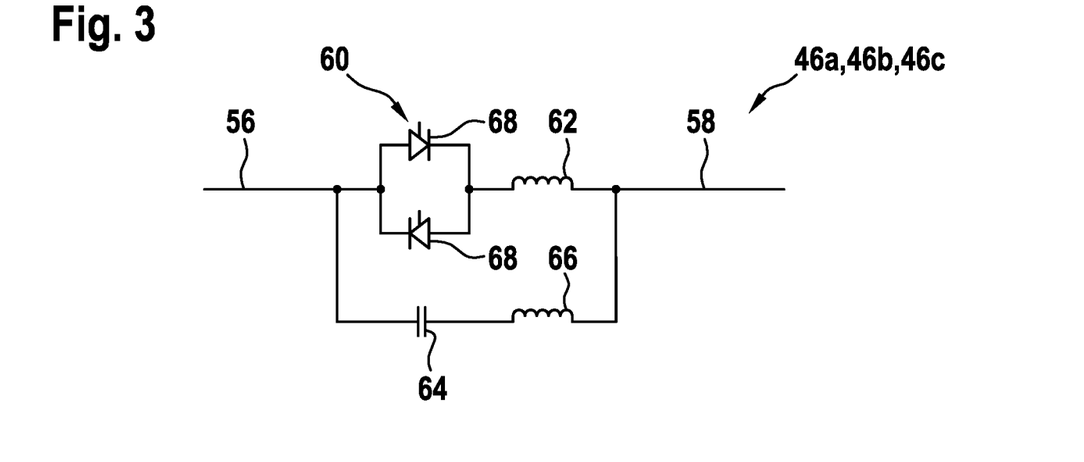
FIG. 3 shows a resonant circuit for the arc furnace of FIGS. 1 and 2.

FIG. 3 shows one of the resonant circuits 46a, 46b, 46c, which may be equally designed. The resonant circuit 46a, 46b, 46c includes a circuit input 56 and a circuit output 58, with which it is interconnected in the respective phase 28a, 28b, 28c, 30a, 30b, 30c. A bypass switch 60 and an inductor 62 are series-connected between the input 56 and the output 58. Furthermore, a capacitor 64 and a main inductor 66, which may be series-connected, are connected between the input 56 and the output 58. The filter capacitor 64 and the main inductor 66 are connected in parallel to the bypass switch 60.

The inductor 62 is optional. It may have an inductance at least 10 times smaller than the inductor 66. With the inductor 62, an overall inductance of the resonant circuit 46a, 46b, 46c may be set.

The bypass switch 60 is a controllable, bidirectional switch, which is composed of two anti-parallel thyristors 68. The controller 54 may control the bypass switch 60 to be opened (conducting) or closed (isolating). By controlling the duty cycle of the bypass switch 60, the controller 54 may control the average current through the bypass switch 60.

When the bypass switch 60 is closed, the filter capacitor 64, the main inductor 66 and the optional inductor 62 form a resonant circuit. The resonant circuit 46a, 46b, 46c therefore may be seen as controllable resonant circuit. A circulating current may form in the resonant circuit 46a, 46b, 46c, which may be used for lowering the current through the resonant circuit 46a, 46b, 46c and therefore the current through the power supply system 12.

Figure 4:
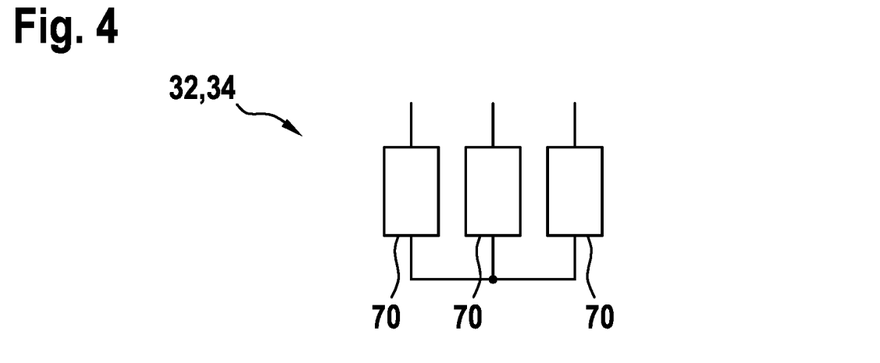
FIG. 4 shows a compensating converter for the arc furnace of FIGS. 1 and 2.
Figure 5:
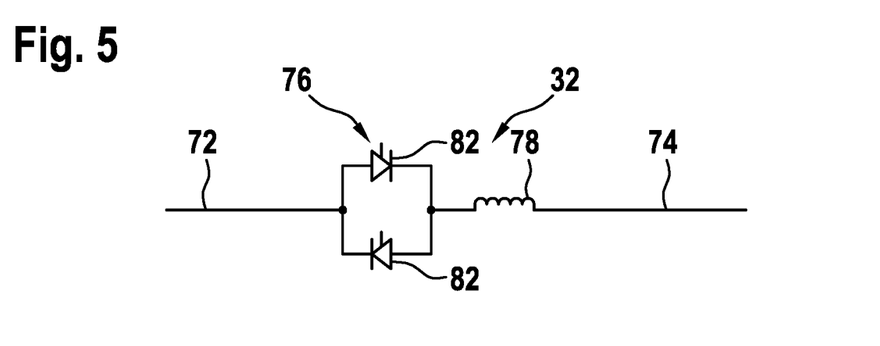
FIG. 5 shows an active inductive reactor for the arc furnace of FIGS. 1 and 2.

FIG. 4 shows the active inductive reactor 32 and/or the compensating converter 34 in more detail. In the case of an active inductive reactor 32, each branch 70 may be as shown in FIG. 5. The branches 70 may be star-connected at one end and connected to one of the phases 28a, 28b, 28c with the other end.

In the case of a compensating converter 34, each branch 70 may be a converter (such as an active controllable bridge converter) with an internal energy storage, for example in the form of a capacitor. The branches 70 may form a static var compensator, which may be controlled by the controller 54.

FIG. 5 shows a phase of an active inductive reactor 32. The active inductive reactor 32 includes an input 72 and an output 74. A bypass switch 76 and an inductor 78 are series-connected between the input 72 and the output 74. The bypass switch 76 is a controllable, bidirectional switch, which is composed of two anti-parallel thyristors 82.

Figure 6:
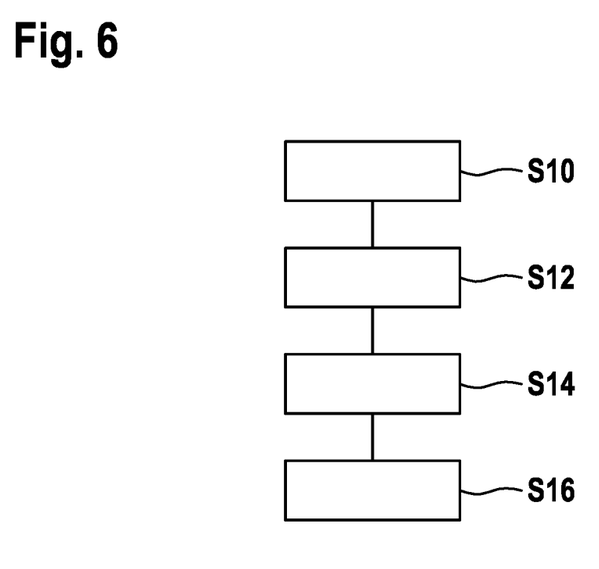
FIG. 6 shows a flow diagram for a method for controlling the arc furnace of FIGS. 1 and 2.

FIG. 6 shows a flow diagram of a method that may performed automatically by the controller 54.

In step S10, the controller 54 measures one or more currents and/or one or more voltages in the power supply system 12. These voltages or currents may be an AC input voltage, an AC input current, an intermediate voltage and/or an intermediated current between the resonant circuits 46a, 46b, 46c and the transformer 26, an AC output voltage and/or an AC output current.

From the measured quantities, an electrode current supplied to the electrodes 14 may be determined. For example, the electrode current may be directly measured as the AC output current or may be estimated from other measured quantities.

In step S12, the bypass switch 60 is controlled, such that the electrode current is adjusted to a defined current. The defined current may be provided by an outer control loop or may be determined by the controller 54 itself, for example, in dependence of an operation condition and/or a power that should be supplied to the electrodes 14.

The control of the bypass switch 60 may be performed, such that a duty cycle of the bypass switch 60 is adjusted to control the electrode current. After a zero crossing of the current through the respective resonant circuit 46a, 46b, 46c, the thyristors 68 of the resonant circuit may switch off automatically and the controller 54 may wait for a specific waiting time before firing the thyristors and switching them on again. As longer the waiting time as shorter the duty cycle and as smaller the current through the resonant circuits 46a, 46b, 46c.

In step S14, an overvoltage and/or a surge current in the resonant circuit 46a, 46b, 46c is detected by the controller based on the measured quantities. In the case, such as fault is detected, the controller 54 protects the resonant circuit 46a, 46b, 46c with the bypass switch 60 by opening and/or closing the bypass switch 60 for a time, which may be longer than a period of the AC current, i.e. the switching may be different from adjusting the duty cycle.

In step S16, the controller 54 also determines a flicker value from the measured quantities, for example from the AC input voltage. The active inductive reactor 32 and/or the compensating converter 34 then may be controlled by the controller 54 to minimize the flicker value. It also may be that a further control objective of the resonant circuits 46a, 46b, 46c is to minimize the flicker and the resonant circuit 46a, 46b, 46c may be controlled accordingly.

While the disclosure has been illustrated and described in detail in the drawings and foregoing description, such illustration and description are to be considered illustrative or exemplary and not restrictive; the disclosure is not limited to the disclosed embodiments. Other variations to the disclosed embodiments can be understood and effected by those skilled in the art and practising the claimed disclosure, from a study of the drawings, the disclosure, and the appended claims. In the claims, the word "comprising" does not exclude other elements or steps, and the indefinite article "a" or "an" does not exclude a plurality. A single processor or controller or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

LIST OF REFERENCE SYMBOLS 10 arc furnace
12 power supply system 14 electrode
16 vessel
18 mechanical actuator
20 AC input
22 electrical grid
24 AC output
26 transformer
28a primary side phase
28b primary side phase
28c primary side phase
30a secondary side phase
30b secondary side phase
30c secondary side phase
32 active inductive reactor
34 compensating converter
36 harmonic filter
36a filter component
36b filter component
36c filter component
36d filter component
38 filter capacitor
40 filter inductor
42 line filter
44 filter inductor
46a resonant circuit
46b resonant circuit
46c resonant circuit
48 passive filter and/or reactor
50 passive filter and/or reactor
52 filter inductor
54 controller
56 circuit input
58 circuit output
60 bypass switch
62 inductor
64 capacitor
66 main inductor
68 thyristor
70 branch
72 input
74 output
76 bypass switch
78 inductor
82 thyristor

The invention claimed is:

1. A power supply system for an electric arc furnace, the power supply system comprising:
an AC input connectable to an electrical grid and an AC output for supplying at least one power electrode of the arc furnace; and
a resonant circuit interconnected between the AC input and the AC output;
wherein the resonant circuit comprises a controllable bypass switch for connecting and disconnecting a circuit input and a circuit output of the resonant circuit;
wherein the resonant circuit comprises a capacitor and a main inductor connected in parallel with the bypass switch; and
wherein the power supply system comprises a controller for controlling the bypass switch, such that a circular current is formed in the resonant circuit, when the bypass switch is closed, which lowers a current through the power supply system.

2. The power supply system of claim 1, wherein a further inductor is connected in series with the bypass switch between the circuit input and the circuit output.

3. The power supply system of claim 2,
wherein the further inductor is connected in parallel with the capacitor and the main inductor; and/or
wherein the capacitor and the main inductor are connected in series.

4. The power supply system of claim 2, wherein the main inductor has a higher inductance as the further inductor.

5. The power supply system of claim 1,
wherein the bypass switch is composed of semiconductor switches; and/or
wherein the bypass switch is a bidirectional switch.

6. The power supply system of claim 1,
wherein the bypass switch comprises two anti-parallel semiconductor switches; and/or
wherein the bypass switch comprises two anti-parallel thyristors.

7. The power supply system of claim 1, further comprising:
a transformer interconnected between the AC input and the resonant circuit; or
a transformer interconnected between the resonant circuit and the AC output.

8. The power supply system claim 1, further comprising:
a harmonic filter interconnected in the AC input;
wherein the harmonic filter comprises at least two filter components, each of which comprises a filter capacitor and a filter inductor and each of which is adapted to another higher order harmonic of an AC input voltage.

9. The power supply system claim 1, further comprising:
an active inductive reactor interconnected into the AC input, wherein the active inductive reactor comprises a bypass switch and an inductor connected to the AC input; and/or
a compensating converter interconnected into the AC input;
wherein the active inductive reactor and/or the compensating converter are controlled to minimize a flicker in the AC input.

10. The power supply system claim 1,
wherein the AC input has at least two phases and/or the AC output has at least two phases; and
wherein a resonant circuit is interconnected in each phase of the AC input and/or in each phase of the AC output.

11. A method for controlling a power supply system claim 1, the method comprising:
determining an electrode current supplied to the at least one electrode; and
controlling the bypass switch, such that the electrode current is adjusted to a defined current, wherein a circular current is formed in the resonant circuit, when the bypass switch is closed, which lowers a current through the power supply system.

12. The method of claim 11, wherein a duty cycle of the bypass switch is adjusted to control the electrode current.

13. The method of claim 11, further comprising:
detecting an overvoltage and/or a surge current in the resonant circuit; and
protecting the resonant circuit with the bypass switch, when an overvoltage and/or a surge current is detected, by opening and/or closing the bypass switch.

14. A controller for an electric arc furnace with a power supply system according to claim 1.

15. An electric arc furnace, comprising:
a power supply system according to claim 1;
a vessel for receiving metal material; and
power electrodes for melting the metal material, when supplied with current from the power supply system.

\* \* \* \* \*